3,632,710
USE OF ALUMINA ALONE OR WITH SILICA AS SINTERING AID FOR BORON CARBIDE
Paul F. Jahn, Chelmsford, Mass., assignor to Avco Corporation, Cincinnati, Ohio
No Drawing. Filed Mar. 14, 1969, Ser. No. 807,415
Int. Cl. C04b 35/56, 35/64
U.S. Cl. 264—65                                   5 Claims

ABSTRACT OF THE DISCLOSURE

The invention discloses a method of forming shaped articles from boron carbide which involves cold molding a powder mixture of boron carbide and from ¾ to 6% alumina and, when the boron carbide contains free carbon, up to 3% of a silica source therein to a preform having a green density of at least 50% of the theoretical density of boron carbide. The preform is then sintered at a temperature in excess of about 2100° C. To prevent warpage of the preform during sintering a pressure not to exceed 10 p.s.i. can be applied during sintering. Shrinkage of the preform during the sintering treatment creates a final shaped article having a density in excess of about 90% of theoretical density.

---

The present invention relates to a process for obtaining high density shaped articles formed of a boron carbide.

The desirability of forming shaped articles from boron carbide ($B_4C$) has long been known to workers in the art; this material offers many advantageous properties to the art such as high hardness, low density and high melting point. Prior to this invention high density shaped articles of boron carbide have been made by a hot pressing procedure wherein finely divided boron carbide powder is simultaneously heated to sintering temperature levels and deformed under pressure until the desired degree of consolidation has been effected. Unfortunately hot pressing involves use of temperature resistant molds and pressurizing equipment. As may be expected hot pressing involves high processing costs and a practical unavailability of oddly shaped boron carbide articles. Certainly a boron carbide fabrication technique which intrinsically is less costly than the hot pressing system would be desirable.

A principal object of this invention is to provide a sinter technique for fabricating high density boron carbide articles.

A further object of the present invention is to provide a boron carbide fabrication technique which obviates the need for pressing at elevated temperatures.

Further objects and advantages of the present invention will become apparent from the detailed description thereof which follows.

Briefly stated the method of the present invention involves forming shaped articles from boron carbide by cold molding a mixture of boron carbide and a non-metallic sintering aid, thereafter heating the so preformed article to sintering temperatures in the absence of hot pressing pressures.

To form a high density article as desired the cold molding step should involve sufficient operating pressures to attain a preform having a green density in excess of about 50% of theoretical density of boron carbide. Shrinkage of the preform at the sintering temperature conditions in excess of about 2100° C. creates in the shaped form an ultimate product density exceeding about 90% of theoretical density.

For adequate sinterability the boron carbide powder employed in practice of the present invention must be finely divided e.g. below about 10 microns and preferably be as small as 1–2 microns and in addition have a high degree of purity. As a practical matter, commercially available boron carbide powders used in hot pressing systems may serve for practice of this invention. Desirably some further comminution of the commercial material is first carried out. The purity level of commercially available boron carbide powder is usually satisfactory. Only occasionally is it necessary to reject a batch of incoming material because it contains excessive free carbon, the most serious impurity. Although presence of up to about 5% free carbon in the boron carbide can, however, be compensated for, as is hereinafter pointed out, pure boron carbide is preferred.

The preferred non-metallic sintering aid preferred for practice of the present invention is alumina ($Al_2O_3$) and it is employed in quantities ranging from about ¾% to 6% by weight of the boron carbide. The preferred operating range is 1–3% by weight. The particle size of the sintering aid alumina should of course be consistent with the boron carbide particle size preferably being the same size and an intimate mixture therewith must be obtained. The presence of less than about 0.75% alumina in the boron carbide powder has some effect but too little to be of material significance. On the other hand, presence of more than about 6% by weight of alumina fails to improve the sinter processability of the mixture, and indeed may detract from the physical properties of the shaped product. Use of any special crystalline form of the alumina, e.g. gamma alumina does not appear to be necessary. Actually, the sintering temperatures exceeding 2100° C. as employed in this process exceeds the melting point of alumina. As a practical matter a high purity alumina should be employed, if only to avoid needlessly adding contaminants to the shaped boron carbide article ultimately produced.

Allusion has already been made to the common presence of free carbon as an impurity in the boron carbide. Free carbon seems to impede shrinkage of the green preform during the sintering. Desirably, then, the boron carbide should have no free carbon therein. As a practical matter, free carbon is present, commonly as much as 4%. Accordingly, the optional employment of a source of silica as a supplementary sintering aid is contemplated in practice of the present invention. The silica source is in addition to alumina and is included only because some free carbon is usually present in the commercially available boron carbide powder. When no free carbon is present the silica fails to improve sinterability. The source of silica, computed as silica ($SiO_2$) shouuld be present in quantities ranging up to about 3% with a preferred range of about ¾ to 1½ by weight of the boron carbide.

In some fashion the silica counteracts the detrimental effects of free carbon and improved sintering results. It is believed that a direct chemical reaction between the silica, the carbon and the boron carbide occurs. Apparently the $SiO_2$ or silica itself is what is significant to the improvement and the improvement may be obtained with any source of silica. Accordingly the silica may be added in any form including for example addition of solid finely divided silica, some liquid compound like ethyl silicate or even an aqueous solution. An inexpensive readily available, easily employed and preferred source of silica is the aqueous of sodium silicate known as water glass. The elevated sintering temperatures exceeding 2100° C. is above the decomposition point of organic silicates, and is over the melting range of sodium silicates and also of the other forms of combined silica. Accordingly, the many possible silica containing materials usable for practice of the present invention may be denominated simply as sources of silica.

In preferred practice the aqueous sodium silicate i.e. water glass, which has proven to be the most convenient source of the silica is admixed with the boron carbide powder after the admixture with alumina without great difficulty and the damp mixture subsequently sieved to break up agglomerates. The silicate moistened boron carbide powder is ideally suited for cold pressing. When thoroughly dried after cold pressing, cold pressed blanks may be machined with diamond tools to intricate shapes and sintered thereafter.

Allusion has been made also to attainment of the high density shaped boron carbide articles. By high density is intended a density in excess of 90% of the theoretical density of boron carbide. The theoretical density is 2.52 g./cc. in practice densities as high as 96% of theoretical have been attained. To attain high density products, the initial cold pressing or cold molding must be carried out at molding pressures exceeding about 1,000 p.s.i. In practice, pressures up to 30,000 p.s.i. have been reached. However, pressures not particularly above the 1,000 p.s.i. create a preform having a green density of about 1.25 grams per cc., or slightly in excess of 50% of the theoretical density of 2.52 g./cc. Such preforms can and do shrink under sintering conditions to about 90% of theoretical density. However, the high degree of shrinkage of from 50% to 90% density makes it difficult to predetermine the exact final size and shape of the sintered boron carbide product. Accordingly, as a practical matter it is preferred to preform with sufficient pressure, i.e. 5 to 10,000 p.s.i. to attain a density of 1.75 g./cc. or better in the green preform. In other words more generally, a green state preform density of above about 60% or more is preferred for actual practice of the present invention. Typically, the green shape density will range between 60%–65% theoretical. Occasionally, complex shapes have necessitated green densities as high as 70%. The higher the green density the lower the shrinkage during sintering and, to some extent, higher density in the final product. Product densities of 96% theoretical have been prepared, the actual instance being the test specimens cold molded to 70% in the green state.

The present procedure completely avoids a hot pressing step, thereby permitting the sintering operation to be carried out in a sintering furnace of uncomplicated design using even a furnace structure open to the atmosphere (for out gassing purposes). The furnace structure forms no part of the present invention and conventional high temperature furnaces may be employed. Typically the furnace would be a graphite block lined structure heated electrically, resistance or induction. The green articles may be placed free standing in the oven chamber of the furnace. In practice no need has been found for any special reducing or inert atmosphere, or need to seal the furnace. The use of graphite blocks to line the furnace and electrical heating thereof creates an almost static furnace atmosphere of nitrogen and carbon monoxide.

Advantageously, it has been possible to heat up the loaded specimens at a relatively rapid rate without detrimental effects. A heating up rate of 500° C. per hour has been employed. Also at the sintering temperatures of above 2100° C. a sinter soak for as little as 3–4 hours has proved sufficient to create the final boron carbide sintered product. Moreover thermal stresses are not severe. Air cooling the furnace is slow enough to avoid thermal cracks in the product; in practice the furnace is turned off and left to cool overnight.

Sintering practice according to the present invention does seem to have one idiosyncrasy, namely that it has been found desirable to sinter the shaped boron carbide object under what may be termed a nominal pressure loading. By nominal is intended a pressure loading ranging from the perhaps 0.01 lb. per sq. inch to something less than 10 lbs. per sq. inch. The loading is effected by placing a temperature resistant weight, e.g. a carbon plate, on each shaped boron carbide article. The nominal pressure loading prevents a small degree of warpage at the peripheral edges of the preform from occurring when the green preform shrinks to its ultimate high density size during course of the sintering operation. Use of a nominal pressure loading is considered desirable with shapes having thin edges particularly those originally cold press preformed to densities, not much above the 50% density level.

For further understanding of the present invention reference is now made to the following example wherein for exemplary purposes the detailed practice of preferred embodiments of the invention is described.

EXAMPLE

A batch of commercially purchased boron carbide powder of −280 mesh size was further comminuted to a 1 to 2 micron average size. This boron carbide powder contains about 4% free carbon by weight thereof.

A 150 gram batch of the boron carbide powder and 4.5 grams of equally finely divided pure alumina (Norton Co. grade 38–900) was milled together in the dry state for 3 hours in a one gallon size laboratory ball mill. Thereafter, 20 cc. of a 22% solids content by weight of an aqueous sodium silicate solution (Sauereisen Cement Corporation, Thinning Liquid No. 15). The sodium silicate content therein was analyzed as approximately equal parts of sodium oxide and silica. The mixture of liquid and powder was mixed in a laboratory paddle blender to intimately admix the ingredients. The resulting damp powder was passed through a 12 mesh screen to break up aggregates. Thereafter the material was cold pressed directly and then air dried overnight to evaporate some of the moisture content.

Molding was carried out at a pressure of 5,000 p.s.i. to produce shaped objects (green preforms) with an apparent density of 1.65 g./cc. This corresponded to approximately 65% of theoretical density, The green preforms were thereafter placed into a graphite tube furnace. The surface areas on which the preforms rested had been dusted with boron nitride. The furnace was then induction heated. The temperature rise was 500° C. per hour until a temperature level of 2130° C.±20° C. was reached and the furnace then maintained at this sintering temperature level for 4 hours. The power was cut and the furnace left to air cool (overnight) to a temperature level at which the sintered products could be removed.

Made in this fashion were 6″ x 6″ x 0.4″ flat plates and 0.4″ thick flat discs 2″, 3″ and 4″ in diameter. In addition, a contoured wire drawing die ⅜″ thick was made in the same fashion. The density of these final products was about 94% of theoretical density. Because of its complex geometric shape, the wire drawing die preform was machined to proper size and shape prior to sintering.

What is claimed is:

1. The method of forming shaped articles from boron carbide comprising:
    providing a mixture consisting essentially of up to 10 micron particles of boron carbide containing 0–5% free carbon, 0.75–6%, by weight of the boron carbide, of alumina having like size or smaller particles, and, when the boron carbide contains free carbon, silica in amounts up to 3% by weight of the boron carbide or a sufficient amount of a material that will release silica at a temperature below 2100° C: in amounts up to 3% by weight of the boron carbide;
    cold molding said mixture under a pressure of at least 1000 p.s.i. to obtain a density of at least 50% of the theoretical density of boron carbide; and
    sintering the molded mixture at a temperature in excess of 2100° C. at a pressure not to exceed 10 p.s.i. until a density of at least 90% theoretical is obtained.

2. The method described in claim 1 wherein the mixture contains essentially no free carbon and no silica or silica source.

3. The method described in claim 1 wherein the particle size of boron carbide and alumina is in the range of 1 to 2 microns, the cold molding pressure 5000–1000 pounds, the cold mold density is in the range of 1.65 to 1.7 and the silica source is sodium silicate.

4. The method as described in claim 1 wherein the cold molding is dried and then machined to shape prior to sintering.

5. The method as described in claim 3 wherein the silica source is in the range of 0.75% to 1.5% by weight of the boron carbide.

References Cited

UNITED STATES PATENTS

| | | | |
|---|---|---|---|
| 2,027,786 | 1/1936 | Ridgway et al. | 264—332 |
| 2,728,128 | 12/1955 | Sheer et al. | 264—65 |
| 3,151,994 | 10/1964 | Adlassnig | 106—43 |
| 3,296,002 | 1/1967 | Hare | 106—43 |
| 3,328,129 | 6/1967 | Muta et al. | 23—208 A |
| 3,338,679 | 8/1967 | Muta et al. | 23—208 A |
| 3,348,925 | 10/1967 | Bartlett | 106—43 |
| 3,440,312 | 4/1969 | Alliegro | 264—332 |
| 3,443,935 | 5/1969 | Lipp | 106—43 |

FOREIGN PATENTS

| | | | |
|---|---|---|---|
| 898,403 | 6/1962 | Great Britain | 23—208 A |
| 1,070,324 | 6/1967 | Great Britain | 106—43 |

OTHER REFERENCES

R. A. Alliegro et al., "Pressure-Sintered Silicon Carbide," appearing in the November 1956 issue of the Journal of the American Ceramic Society at pp. 386–389.

R. A. Alliegro, "Boron Carbide: Key to Reactor Control," December 1970, Ceramic Age, at pp. 32–34.

JULIUS FROME, Primary Examiner

J. H. MILLER, Assistant Examiner

U.S. Cl. X.R.

106—43, 65; 264—56, 332

PO-1050
(5/69)

UNITED STATES PATENT OFFICE
CERTIFICATE OF CORRECTION

Patent No. 3,632,710      Dated January 4, 1972

Inventor(s) Paul F. Jahn

It is certified that error appears in the above-identified patent and that said Letters Patent are hereby corrected as shown below:

Line 49, Col. 2, for "shouuld", read---should---; line 51, Col. 2, after "1-1/2", insert--- % ---; Line 53, Col. 2, for "effects", read --- effect ---; line 63, Col. 2, after "aqueous", read --- solution ---; and line 62, col. 4, after " 2100° C", omit --- ; ---.

Signed and sealed this 4th day of July 1972.

(SEAL)
Attest:

EDWARD M. FLETCHER, JR.      ROBERT GOTTSCHALK
Attesting Officer      Commissioner of Patents